United States Patent
Cezanne et al.

(10) Patent No.: US 11,592,326 B2
(45) Date of Patent: Feb. 28, 2023

(54) FILLING LEVEL INDICATOR

(71) Applicant: CONTINENTAL AUTOMOTIVE GmbH, Hannover (DE)

(72) Inventors: Alexander Cezanne, Mörfelden-Walldorf (DE); Hans-Guenter Benner, Kriftel (DE); Matthias Kadler, Rüsselsheim (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 840 days.

(21) Appl. No.: 16/319,134

(22) PCT Filed: Jul. 12, 2017

(86) PCT No.: PCT/EP2017/067481
§ 371 (c)(1),
(2) Date: Jan. 18, 2019

(87) PCT Pub. No.: WO2018/015233
PCT Pub. Date: Jan. 25, 2018

(65) Prior Publication Data
US 2021/0356314 A1    Nov. 18, 2021

(30) Foreign Application Priority Data
Jul. 22, 2016   (DE) .......................... 102016213498.1

(51) Int. Cl.
*G01F 23/38* (2006.01)
*B60K 15/03* (2006.01)

(52) U.S. Cl.
CPC .............. *G01F 23/38* (2013.01); *B60K 15/03* (2013.01); *B60K 2015/03217* (2013.01)

(58) Field of Classification Search
CPC ....................................................... G01F 23/38
USPC ............................................................ 73/313
See application file for complete search history.

(56) References Cited

U.S. PATENT DOCUMENTS

| | | | | |
|---|---|---|---|---|
| 5,142,449 A | * | 8/1992 | Littlebury | G01R 1/0735 257/533 |
| 5,442,865 A | * | 8/1995 | Wallrafen | G01D 5/165 33/DIG. 1 |
| 2004/0221645 A1 | * | 11/2004 | Brzozowski | G01F 23/38 73/313 |

FOREIGN PATENT DOCUMENTS

| | | |
|---|---|---|
| DE | 197 01 246 | 7/1998 |
| DE | 10 200 867 | 7/2003 |
| DE | 103 29 044 | 1/2005 |
| DE | 10 2004 039 853 | 3/2006 |

(Continued)

*Primary Examiner* — John Fitzgerald
*Assistant Examiner* — Rodney T Frank
(74) *Attorney, Agent, or Firm* — Cozen O'Connor (57) ABSTRACT

A filling level indicator for determining a filling level in a tank, having a resistor network, a contact element, and a magnetic element. The contact element is spaced apart from the resistor network and the magnetic element is movable relative to the resistor network and the contact element. The contact element has a contact region deflectable by the magnetic element. An electrically conductive connection between the contact region and the resistor network is produced by deflection of the contact region. The contact region is formed by a planar tape-shaped element and the contact region has contact portions that are spaced apart from one another in the circumferential direction. The contact portions are separated from one another by separation regions.

12 Claims, 4 Drawing Sheets

(56) References Cited

FOREIGN PATENT DOCUMENTS

DE 10 2008 011 713 9/2009

* cited by examiner

PRIOR ART

FILLING LEVEL INDICATOR

CROSS REFERENCE TO APPLICATIONS

This is a U.S. national stage of application No. PCT/EP2017/067481, filed on Jul. 12, 2017. Priority is claimed on German Application No. DE102016213498.1, filed Jul. 22, 2016, the content of which is incorporated here by reference.

BACKGROUND OF THE INVENTION

1. Field of the Invention

The invention relates to a filling level indicator for determining a filling level in a tank, having a resistor network, having a contact element, and a magnetic element, wherein the contact element is arranged so as to be spaced apart from the resistor network and the magnetic element is movable relative to the resistor network and the contact element. The contact element has a contact region that is deflectable by the magnetic element and an electrically conductive connection between the contact region and the resistor network is capable of being produced by the deflection of the contact region.

2. Description of the Prior Art

Filling level indicators for determining the filling level in a fuel tank have a resistor network that generates a signal as a function of the actual filling level, which signal corresponds to the filling level in the fuel tank. For this purpose, a float is generally provided that floats on the surface of the fuel in the fuel tank and acts on the resistor network by a linkage mechanism and a sliding contact. The movement of the float owing to a rising or falling filling level is transmitted via the linkage mechanism to the sliding contact, which is moved past the resistor network as a result of the movement. Here, a varying signal is generated as a function of the position of the sliding contact. By standardizing the signal and by configuring the resistor network in a specific way it is possible to infer the filling level in the fuel tank directly from the signal generated at the resistor network. Such filling level indicators are known in a wide variety of forms in the prior art.

Moreover, filling level indicators are known which, instead of a sliding contact, have a contact element with a multiplicity of finger-like portions deflectable by a magnetic force in such a way that electrical contact is generated between the finger-like portion and a resistor network. A signal is generated as a result of the generation of the electrical contact. By the generated signal, it is possible to infer the filling level in the fuel tank directly as a function of the configuration of the resistor network and of the contact element. Such a filling level indicator is known, for example, from DE 197 01 246 A1.

A disadvantage of the devices in the prior art is in particular that the sliding contact on the resistor network constitutes a mechanical contacting element, which is subject to inevitable wear. Furthermore, the sliding contact and the resistor network are in this case arranged entirely in the fuel within the fuel tank, which can result in damaging effects caused by the fuel. The generation of the electrical contact by a contact element with a multiplicity of finger-like portions which can be deflected by a magnet is disadvantageous, because the contact element is highly sensitive to mechanical disturbance influences, which, in particular, makes the installation and transport of the contact elements difficult.

SUMMARY OF THE INVENTION, PROBLEM, SOLUTION, ADVANTAGES

An object of one aspect of the present invention is a filling level indicator that has a mechanically more resistant contact element and permits wear-free generation of as accurate a signal as possible, which is dependent on the filling level in the fuel tank.

One exemplary embodiment of the invention relates to a filling level indicator for determining a filling level in a tank, having a resistor network, a contact element, and a magnetic element. The contact element is arranged so as to be spaced apart from the resistor network and the magnetic element is movable relative to the resistor network and the contact element. The contact element has a contact region which is deflectable by the magnetic element, wherein an electrically conductive connection between the contact region and the resistor network is capable of being produced by means of the deflection of the contact region. The contact region is formed by a planar tape-shaped element and the contact region has a multiplicity of contact portions that are spaced apart from one another in the circumferential direction and arranged so as to be mutually adjacent, wherein the contact portions are separated from one another by separation regions.

The contact element preferably has a first region for attaching the contact element to the carrier substrate of the resistor network. Furthermore, the contact element has a second contact region that serves in particular for contacting the resistor network. For this purpose, the contact region can be deflected toward the resistor network as a result of the magnetic forces of the magnetic element. The magnetic element can be moved on the side of the carrier substance that faces away from the resistor network and attract different portions of the contact region as a function of its respective position and deflect them from their respective starting position.

In a filling level indicator of the type according to one aspect of the invention, the magnetic element can be mounted to be rotatable about a fixed point of rotation. There is preferably provided, for example, a lever arm that has a float on an end region and is connected to the magnetic element in such a way that the magnetic element can be moved about the point of rotation about which the lever arm is rotatably mounted. The preferred movement path of the magnetic element is therefore formed by a circular arc portion. The upward and downward movement of the float, resulting from the rising or falling filling level in the tank, thus produces a movement of the magnetic element along a circular arc portion. The movement of the magnetic element is thus directly dependent on the upward and downward movement of the float.

Only a subregion of the contact region of the contact element is thus preferably deflected as a function of the position of the magnetic element. Since the resistor network is designed in such a way that a multiplicity of different electrical resistors are realized therein, a varying electrical signal can be generated depending on which subportion of the resistor network is used to produce an electrically conducting connection. In one particularly advantageous embodiment, each subportion of the resistor network is assigned a specific electrical resistor which in turn is assigned to a specific position of the float and thus also of the magnetic element. In this way, the respectively generated electrical signal can be clearly assigned to a certain filling quantity in the fuel tank.

The contact element and in particular the contact region are formed to follow the preferred path curve of the magnetic element formed by a circular arc portion. This is advantageous in order that the distance between the magnetic element and the respective portion of the contact region is as uniform as possible over the entire extent of the contact region. It can be ensured in this way that the applied magnetic force, which is preferably invariable, over the entire spatial extent of the contact region leads to a uniform deflection of the contact element or of the contact region.

The circumferential direction of the contact region corresponds to the direction of movement of the magnetic element along the circular arc portion defined by the fixed point of rotation. The contact region is subdivided into mutually adjacent contact portions along this direction of movement of the magnetic element. These contact portions are deflected toward the resistor network as a function of the position of the magnetic element. Here, the contact portion arranged exactly above the magnetic element is brought into electrically conducting contact with the resistor network.

The contact portions are preferably separated from one another by separation regions. The separation regions in particular contribute to the fact that a certain relative movement is possible between mutually adjacent contact portions. With particular preference, the separation regions allow the deflection of a defined contact portion from the rest position, whereas the contact portions directly adjacent thereto remain substantially in the rest position or starting position.

It is particularly advantageous if the separation regions have a material thickness reduced by comparison with the remaining contact region. A material thickness of the separation regions that is reduced by comparison with the remaining contact region is advantageous since it is thereby made possible in a simple manner that a relative movement of the individual contact portions to one another becomes possible. In particular, the separation regions with a reduced material thickness allow a defined bending of the mutually adjacent contact portions.

A reduced material thickness means that the separation regions have a lower stiffness than the contact portions adjacent thereto. The separation regions therefore act as joints between the respectively adjacent contact portions. A reduction in the material thickness can be produced, for example, by a targeted material removal.

It is also advantageous if the separation regions are formed as predetermined bending regions. An intended bending between mutually adjacent contact portions can be produced by the separation regions, which advantageously have reduced material thicknesses or an increased flexibility provided in some other way. This is particularly advantageous in order preferably to deflect only one individual of the contact portions from the starting position and to guide it toward the resistor network arranged below. Alternatively, a contact portion can also be deflected in a targeted manner, with the respectively adjacent contact portions also being partially deflected. Whether and how many adjacent contact portions are concomitantly deflected substantially depends on the amplitude of the deflection, the width of the contact portions and the flexibility of the separation regions.

A preferred exemplary embodiment is characterized in that the contact portions are connected to one another by the separation regions in the manner of film hinges. A connection of the contact portions in the manner of film hinges produces an optimally high flexibility along the circumferential direction of the contact region. It can thereby be ensured that the magnetic force generated by the respective magnetic element can be relatively low and nevertheless a sufficiently high deflection of the contact region or of the contact portions is guaranteed. Whereas the flexibility is sufficient for deflecting the individual contact portions, a sufficiently high stiffness or stability of the contact region is simultaneously ensured by the film hinge-like structure, thereby excluding a situation in which unintended contacting of the resistor network by one of the contact portions is produced as a result of vibrations or other disturbance influences.

It is also to be preferred if the separation regions have perforations, with the result that the connecting surface between two mutually adjacently arranged contact portions is reduced. A perforation of the separation regions particularly results in the fact that the connecting surface between mutually adjacently arranged contact portions is reduced. Consequently, the flexibility between mutually adjacent contact portions is increased. With particular preference, the separation regions have perforations only in certain portions, which means that in any case there is still a connection between adjacent contact portions. The mutually adjacent contact portions can thus not be deflected completely independently of one another.

Moreover, it is advantageous if the contact region is segmented by the separation regions. The contact region is preferably segmented or subdivided by the separation regions into a multiplicity of contact portions. This is advantageous in order to obtain a filling level indicator in which the individual contact surfaces of the resistor network can be assigned in a targeted manner to individual contact portions of the contact region. As a result of so-called matching in the production process, the individual contact portions can be arranged specifically over the individual contact surfaces of the resistor network. A deflection of the contact portions thus makes it possible to produce a defined electrical contacting of a predetermined contact surface of the resistor network.

Furthermore, it is advantageous if a deflection of an individual contact portion or of a contact portion and the contact portions arranged directly adjacent thereto toward the resistor network can be produced by the magnetic force of the magnetic element, wherein only at most one contact surface of the resistor network is simultaneously electrically contactable by the deflected contact portions. Since the contact portions are connected to one another by the separation regions, the individual contact portions cannot be moved completely independently of one another. The deflection of an individual contact portion thus necessarily leads to an at least partial deflection of the respectively adjacent contact portions. Preferably, however, there occurs in each case only a contacting of the mainly deflected contact portion with one of the contact surfaces of the resistor network. A configuration differing herefrom in which one or more of the contact portions come into electrically conducting contact with the contact surfaces of the resistor network is also conceivable if the contact surfaces of the resistor network are arranged with a sufficiently far spacing from one another, with the result that it is ensured that only a small number, preferably only one contact surface, of the resistor network is simultaneously electrically contacted. Otherwise, a multiplicity of electrical signals with different resistance values would be generated, whereby the clear assignment of the electrical signal to a filling level in the tank would be made more difficult. Use would have to be made in this case of algorithms, for example, in order to process the generated electrical signals and to allow a more accurate statement. Depending on the required accuracy of the filling level indicator, it is also possible to dispense with this.

It is also expedient if the separation regions of the contact region are produced by cutouts on the surface facing the resistor network and/or by cutouts on the surface facing away from the resistor network. The separation regions can also be characterized by cutouts, for example, which increase the flexibility of the separation regions by comparison with the contact portions. Such cutouts can be produced, for example, by machining the contact region and have different cross sections. For example, rectangular, semicircular or V-shaped cross sections are conceivable here.

Moreover, it is advantageous if the separation regions are formed by an elastomer, wherein the elastomer interconnects the contact portions directly adjoining the separation region. The provision of an elastomer can advantageously be used in order to produce a defined stiffness in the separation regions. An elastomer, such as rubber or silicone, for example, can be incorporated between mutually adjacently arranged contact portions in order to produce a flexible but nevertheless durable connection of the individual contact portions to one another. The contact region is thus formed by a type of link element with metallic regions, the contact portions, and regions composed of an elastomer, the separation regions. A contact region is thus produced which has a flexibility and stiffness which differ from one another in certain regions. The deflection of individual contact portions can be simplified by virtue of a particularly flexible elastomer, with the result that in particular smaller magnetic forces and thus a smaller magnetic element are necessary.

Furthermore, it is expedient if the contact portions are connected in an electrically conducting manner by electrically conductive structures over the separation regions formed from an elastomer. The provision of electrically conductive structures means that the individual contact portions can be connected to one another in an electrically conducting manner, with the result that it can be ensured that the individual contact portions have a common electrical potential. Particularly if the separation regions are formed from non-electrically conducting materials and the contact portions are also otherwise not in an electrically conducting connection with one another, additional electrically conductive structures, such as, for example, vapor-deposited conductor tracks or some other cable connection, are advantageous in order to produce an electrically conducting connection between the contact portions.

Advantageous developments of the present invention are described in the dependent claims and in the following description of the figures.

BRIEF DESCRIPTION OF THE DRAWINGS

The invention will be discussed in detail below by means of exemplary embodiments and with reference to the drawings. In the drawings.

PREFERRED EMBODIMENT OF THE INVENTION

Figure 1:
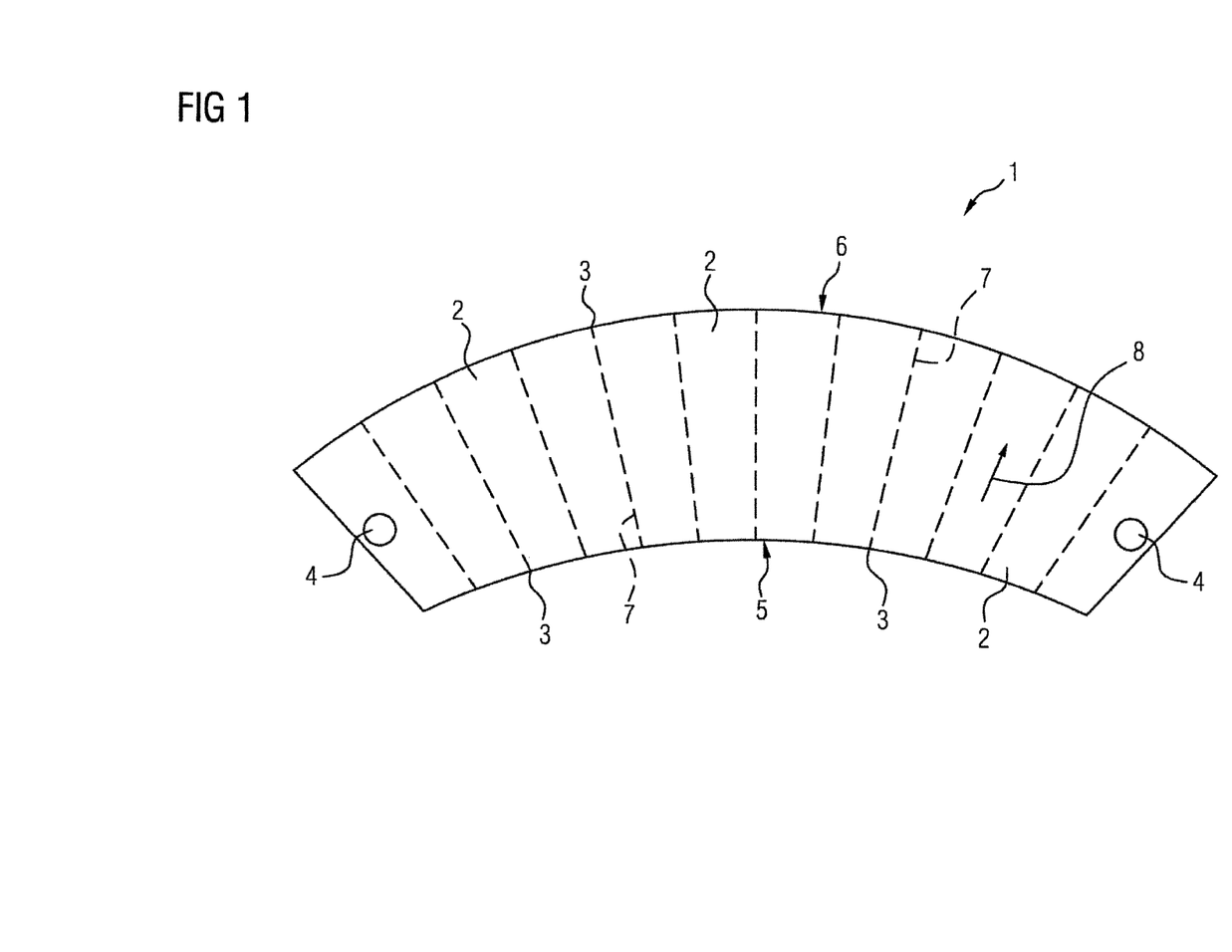
FIG. 1 is a plan view of an arcuate contact element, wherein the contact element is subdivided into a multiplicity of mutually adjacently arranged contact portions.

FIG. 1 shows a plan view of a contact element 1 that is arcuate in design. The contact element 1 has the shape of a circular arc portion, with the result that it is particularly well adapted to the movement path of the magnetic element, which is typically a rotary movement about a fixed point of rotation.

Figure 3:
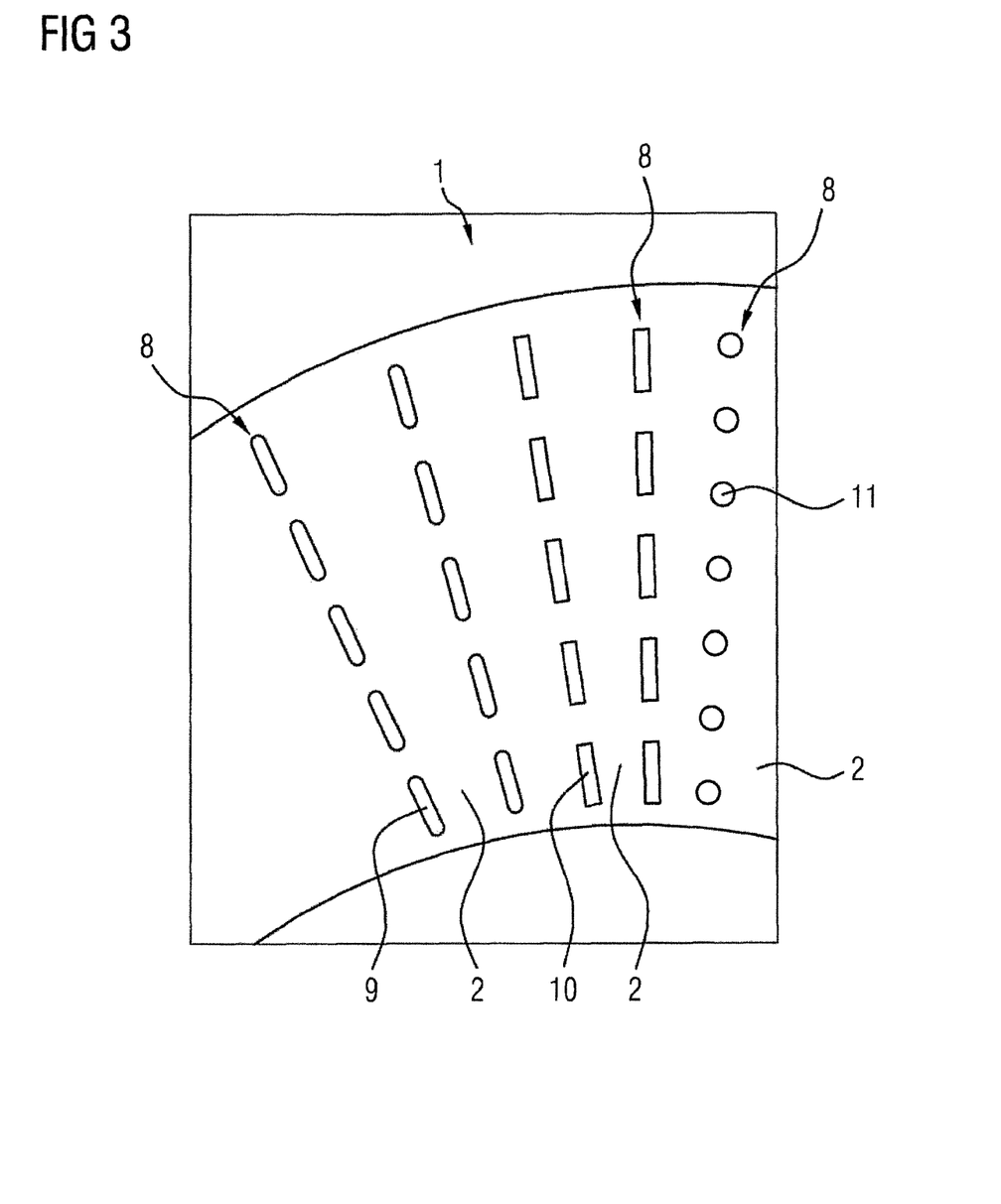
FIG. 3 is a detail view of the contact element of FIG. 1, wherein different configurations of perforations which can be provided for separating the individual contact portions from one another are illustrated.
Figure 4:
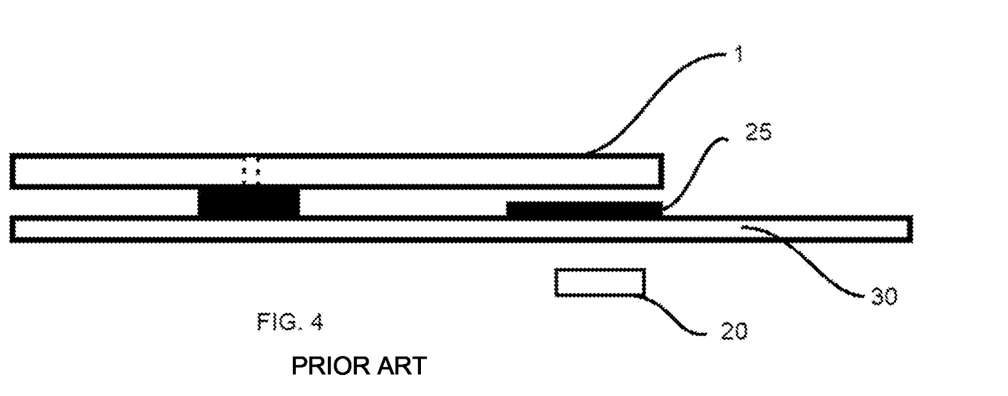
FIG. 4 is a side view of a prior art filling level indicator for determining a filling level in a tank.
Figure 5:
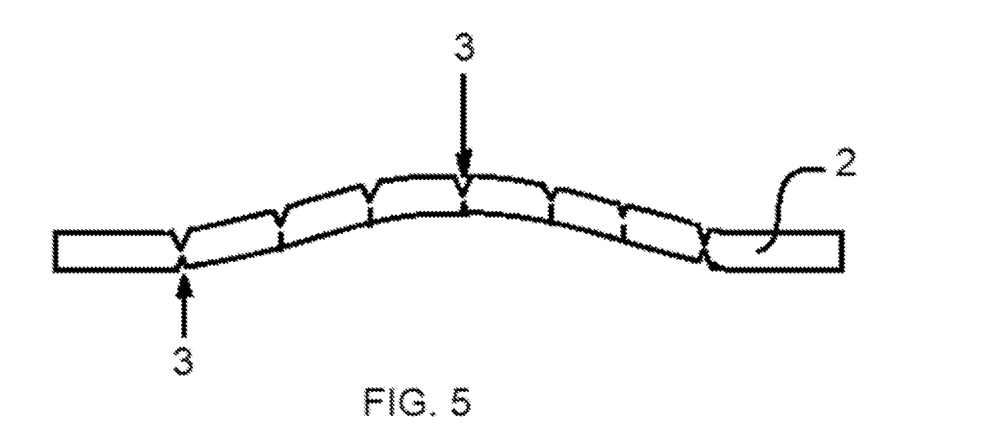
FIG. 5 is the contact element in a flexed condition.

FIG. 4 is a side view of a prior art filling level indicator for determining a filling level in a tank. The filling level indicator for determining a filling level in a tank, has a substrate 30, resistor network 25, a contact element 1, and a magnetic element 20. The contact element I is arranged so as to be spaced apart from the resistor network 25 and the magnetic element 20 is movable relative to the resistor network and the contact element. The contact element 1 has a contact region which is deflectable by the magnetic element, as shown in FIG. 5. The separation regions 3 are formed there by wedge-shaped tapers that have a thickness greater than zero, at least in parts because the wedge-shaped taper is not a cutout, as shown in FIG. 3.

The contact element 1 is formed into a multiplicity of contact portions 2 which are arranged next to one another and separated from one another by separation regions 3. Here, the contact portions 2 form subregions of the contact element 1 and in particular of the contact region of the contact element 1. In the exemplary embodiment of FIG. 1, the outer two end regions, which have the holes 4, are designed as attachment regions via which the contact element 1 can be attached to a carrier substrate of the resistor network. The contact portions 2 situated in between together form the contact region.

In an alternative embodiment of the contact element, the attachment of the contact element can also be arranged at the radially inner edge region 5 or the radially outer edge region 6.

The contact portions 2 are separated from one another by separation regions indicated by dashed lines 7. The separation regions 7 can extend over the entire contact element 1 in the radial direction 8, as is illustrated in FIG. 1.

Figure 2:
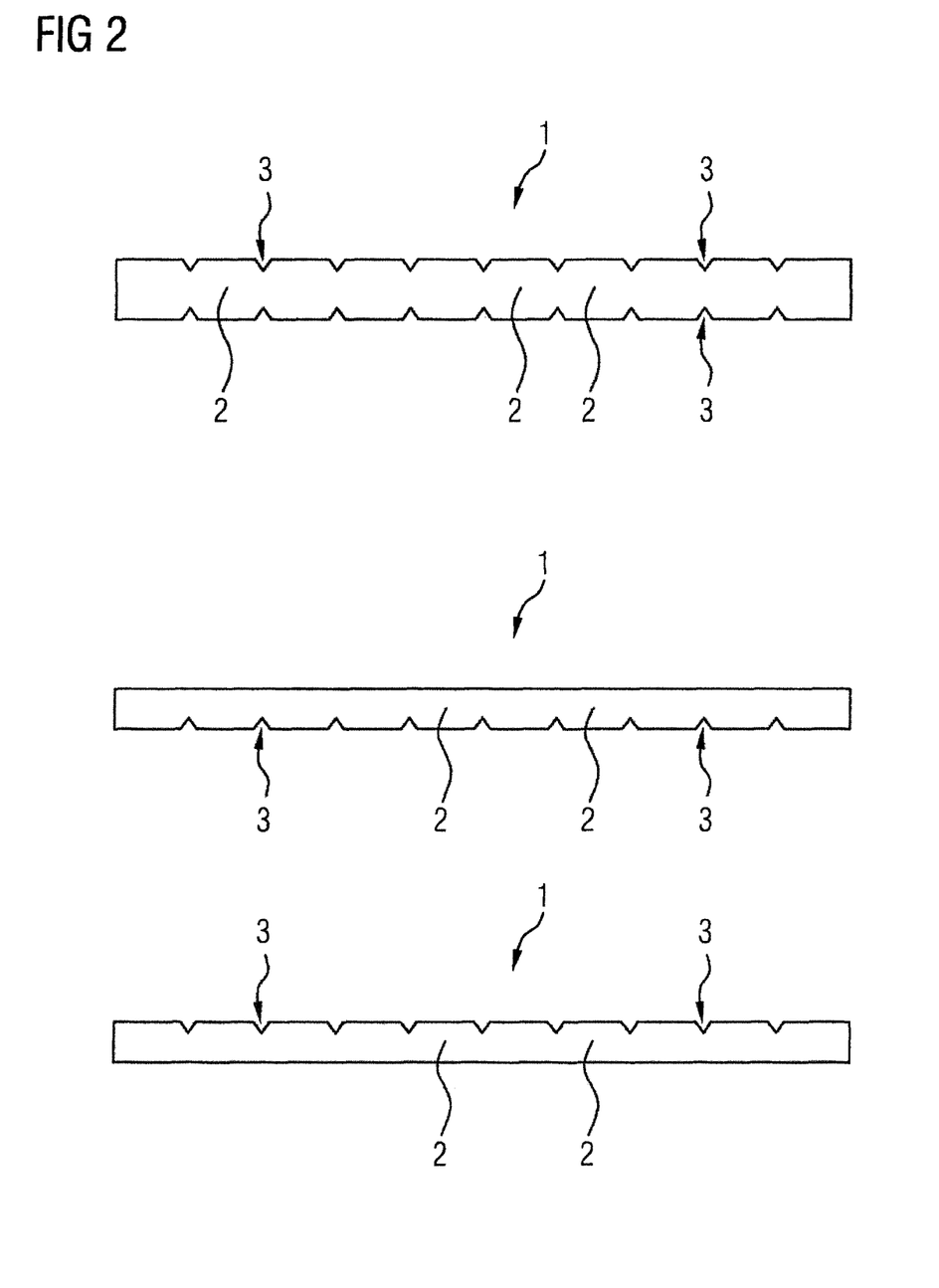
FIG. 2 is three sectional views of the contact element shown in FIG. 1, wherein in the upper section the separation regions are formed by tapers of the contact element which are provided on both sides, in the central section the separation regions are formed by tapers provided on the lower side, and in the lower section the separation regions are formed by tapers incorporated from above.

FIG. 2 shows three different embodiments of the contact element, as has already been shown in FIG. 1. Here, the views are shown as a cross section through the contact element 1.

The upper cross section shows a contact element 1 with separation regions 3. The separation regions are formed by wedge-shaped tapers of the contact element. In the upper cross section, the wedge-shaped tapers are incorporated into the contact element 1 both from above and from below. As a result, the contact portions 2 can be deflected both upwardly and downwardly in relation to the contact portions 2 respectively adjacent thereto. The separation regions 3 act as joints between the contact portions 2.

The central cross section shows a contact element, wherein the separation regions 3 are formed there by wedge-shaped tapers incorporated into the contact element 1 only from below. This substantially facilitates the upward movement of a contact portion 2. An upward movement causes the two cheeks of a wedge-shaped taper 3 to fold toward one another until they come into abutment with one another, with the result that the movement is stopped or considerably impeded.

By contrast, the lower cross section shows a contact element with wedge-shaped tapers which are incorporated from above. Particularly a downward movement is facilitated as a result.

The wedge-shaped tapers are to be taken as examples and do not limit the possible solutions according to the invention. Other cross sections of tapers are also conceivable. The depth of the taper can also vary so as in particular to vary the flexibility of the contact element in the region of the tapers.

FIG. 3 shows a detail view of the contact element 1 of FIG. 1, wherein the dashed lines 7, which indicate the separation regions, are illustrated in detail. The exemplary embodiment of FIG. 3 has, by way of example, different perforations which are incorporated into the contact element 1 in order to produce an increased flexibility between the contact portions 2. Here, the perforations 8 in the left-hand region are configured for example in the manner of slots 9. Rectangular cutouts, which form the perforation 8, are represented by the reference sign 10. In addition, circular cutouts are represented by the reference sign 11. Moreover, different shapes and in particular sizes can also be chosen for the perforations. The mutually adjacently arranged contact portions 2 are preferably in each case connected to one another by still at least two webs, with the result that the contact portions 2 cannot move completely independently of one another.

The different features of the individual exemplary embodiments can also be combined with one another. The exemplary embodiments in FIGS. 1 to 3 are in particular not of a limiting nature and serve for illustrating the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A filling level indicator for determining a filling level in a tank, comprising:
a resistor network;
a contact element that is arranged to be spaced apart from the resistor network;
a magnetic element configured to be movable relative to the resistor network;
a contact region of the contact element formed by a planar tape-shaped element and configured to be deflectable by the magnetic element, wherein an electrically conductive connection between the contact region and the resistor network is produced by deflection of the contact region,
wherein the contact region has a multiplicity of contact portions which are spaced apart from one another in the circumferential direction and which are arranged so as to be mutually adjacent,
wherein the multiplicity of contact portions are laterally separated from one another by radially extending wedge-shaped tapers in separation regions, wherein the separation regions have a material thickness which is reduced by comparison with a remaining contact region,
wherein the separation regions have a thickness greater than zero.

2. The filling level indicator as claimed in claim 1, wherein the separation regions are formed as predetermined bending regions.

3. The filling level indicator as claimed in claim 1, wherein the multiplicity of contact portions are connected to one another by the separation regions in a manner of film hinges.

4. The filling level indicator as claimed in claim 1, wherein the contact region is segmented by the separation regions.

5. The filling level indicator as claimed in claim 1,
wherein a deflection of an individual contact portion or of a respective contact portion and contact portions arranged directly adjacent thereto toward the resistor network is produced by a magnetic force of the magnetic element,
wherein at most only one contact surface of the resistor network is simultaneously electrically contactable by deflected contact portions.

6. The filling level indicator as claimed in claim 1, wherein the separation regions of the contact region are produced by cut-outs on at least one of:
a surface facing the resistor network and
a surface facing away from the resistor network.

7. The filling level indicator as claimed in claim 1, wherein the separation regions are formed by an elastomer, wherein the elastomer interconnects respective contact portions directly adjoining a respective separation region.

8. The filling level indicator as claimed in claim 7, wherein the contact portions are connected in an electrically conducting manner by electrically conductive structures over the separation regions formed from an elastomer.

9. The filling level indicator as claimed in claim 1, wherein two respective cheeks of the wedge-shaped tapers in the separation regions are configured to fold toward one another until they come into abutment with one another to limit movement.

10. The filling level indicator as claimed in claim 1, wherein the separation regions are configured as joints.

11. The filling level indicator as claimed in claim 1, wherein the separation regions are predetermined bending regions.

12. A filling level indicator for determining a filling level in a tank, comprising:
a resistor network;
a contact element that is arranged to be spaced apart from the resistor network;
a magnetic element configured to be movable relative to the resistor network;
a contact region of the contact element formed by a planar tape-shaped element and configured to be deflectable by the magnetic element, wherein an electrically conductive connection between the contact region and the resistor network is produced by deflection of the contact region, wherein the contact region has a multiplicity of contact portions which are spaced apart from one another in the circumferential direction and which are arranged so as to be mutually adjacent, wherein the multiplicity of contact portions are laterally separated from one another by separation regions, wherein the separation regions comprise a plurality of radially alternating lands and cutouts, wherein the lands of the separation regions have a thickness greater than zero, wherein the plurality of alternating lands and cutouts of the separation regions are radially extending perforations, by which a respective connecting surface between two mutually adjacently arranged contact portions is reduced.

* * * * *